(12) United States Patent
Schoo et al.

(10) Patent No.: US 6,232,673 B1
(45) Date of Patent: May 15, 2001

(54) WINDMILL

(75) Inventors: Alfred Schoo; Arno Klein-Hitpass, both of Bocholt (DE)

(73) Assignee: A. Friedr. Flender AG, Bocholt (DE)

( * ) Notice: Subject to any disclaimer, the term of this patent is extended or adjusted under 35 U.S.C. 154(b) by 0 days.

(21) Appl. No.: 09/547,012

(22) Filed: Apr. 11, 2000

(30) Foreign Application Priority Data

Apr. 12, 1999 (DE) .............................................. 199 16 453

(51) Int. Cl.[7] ...................................................... F03D 9/00
(52) U.S. Cl. ........................... 290/55; 290/1 C; 475/342; 60/398
(58) Field of Search ................................ 290/55, 44, 1 C, 290/4 C; 475/162, 342; 60/398

(56) References Cited

U.S. PATENT DOCUMENTS

| | | | |
|---|---|---|---|
| 2,653,250 | * 11/1953 | Romani | 290/4 C |
| 3,792,629 | * 2/1974 | Applebury | 475/342 |
| 4,239,977 | * 12/1980 | Strutman | 290/44 |
| 4,440,044 | * 4/1984 | Heller | 475/162 |
| 4,871,923 | * 10/1989 | Scholz et al. | 290/55 |

FOREIGN PATENT DOCUMENTS

| | | | |
|---|---|---|---|
| 0037002A1 | * 10/1981 | (EP) | . |
| 0388207A1 | * 9/1990 | (EP) | . |
| 0635639A1 | * 1/1995 | (EP) | . |
| 9119916 | * 12/1991 | (WO) | . |
| 9521326 | * 8/1995 | (WO) | . |
| 9611338 | * 4/1996 | (WO) | . |

* cited by examiner

Primary Examiner—Thomas M. Dougherty
Assistant Examiner—Joseph Waks
(74) Attorney, Agent, or Firm—Max Fogiel

(57) ABSTRACT

A wind-power plant with a rotor. The rotor's hub is accommodated in a roller bearing. The roller bearing is mounted on a support and connected to a planetary gear. The planetary gear comprises two stages, specifically an input stage and an output stage. The planetary gear's output shaft is coupled by way of a clutch to a generator. The roller bearing (3) has an inner ring (7) that is attached to and can be detached from both the hub (1) and the rotating part of the planetary gear. The generator (11) has a housing that is combined with and can be removed from the planetary gear to constitute a drive-train module. The module rests on the rotor support (4) and can be dynamically separated from the overall plant.

7 Claims, 5 Drawing Sheets

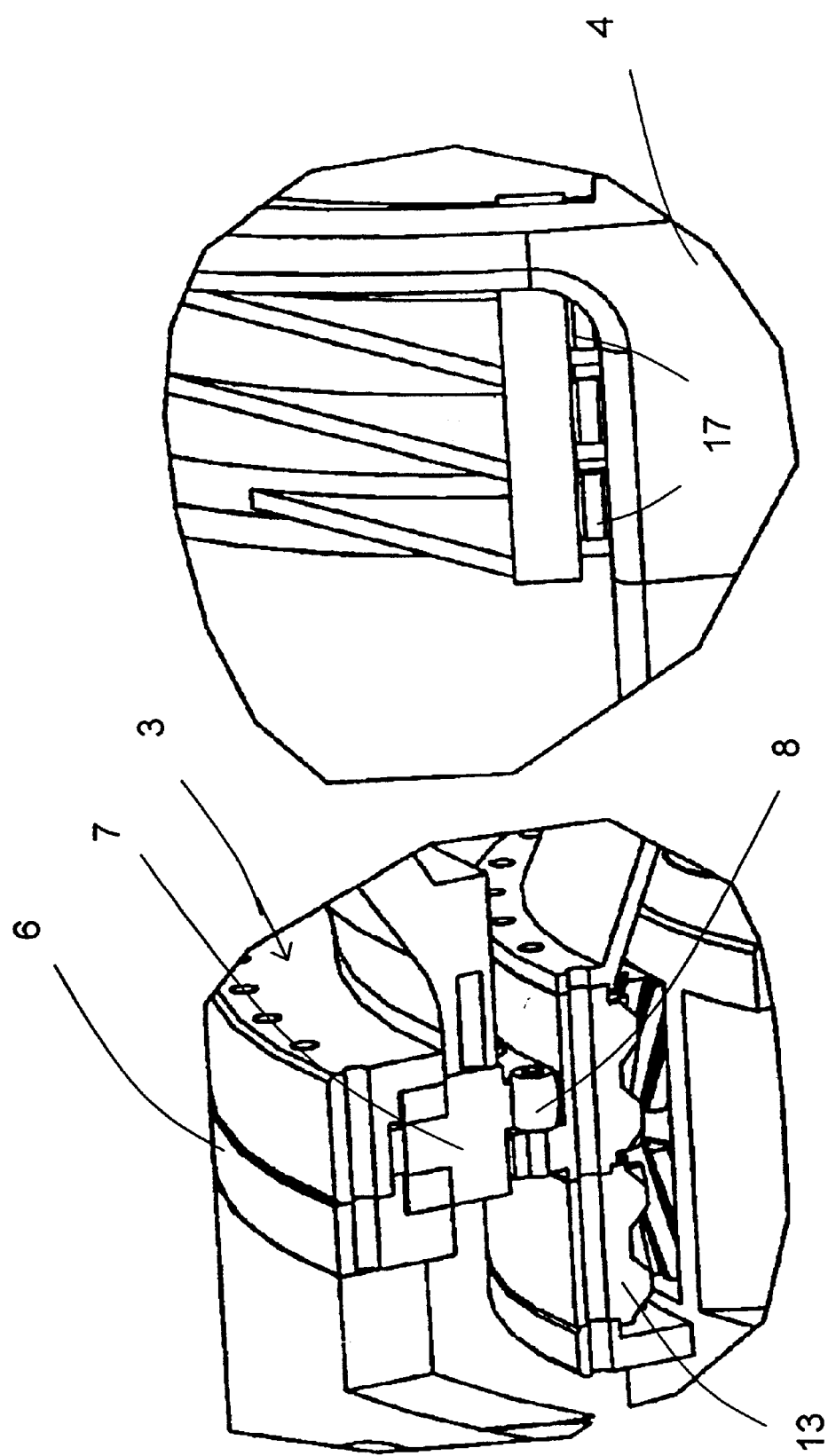

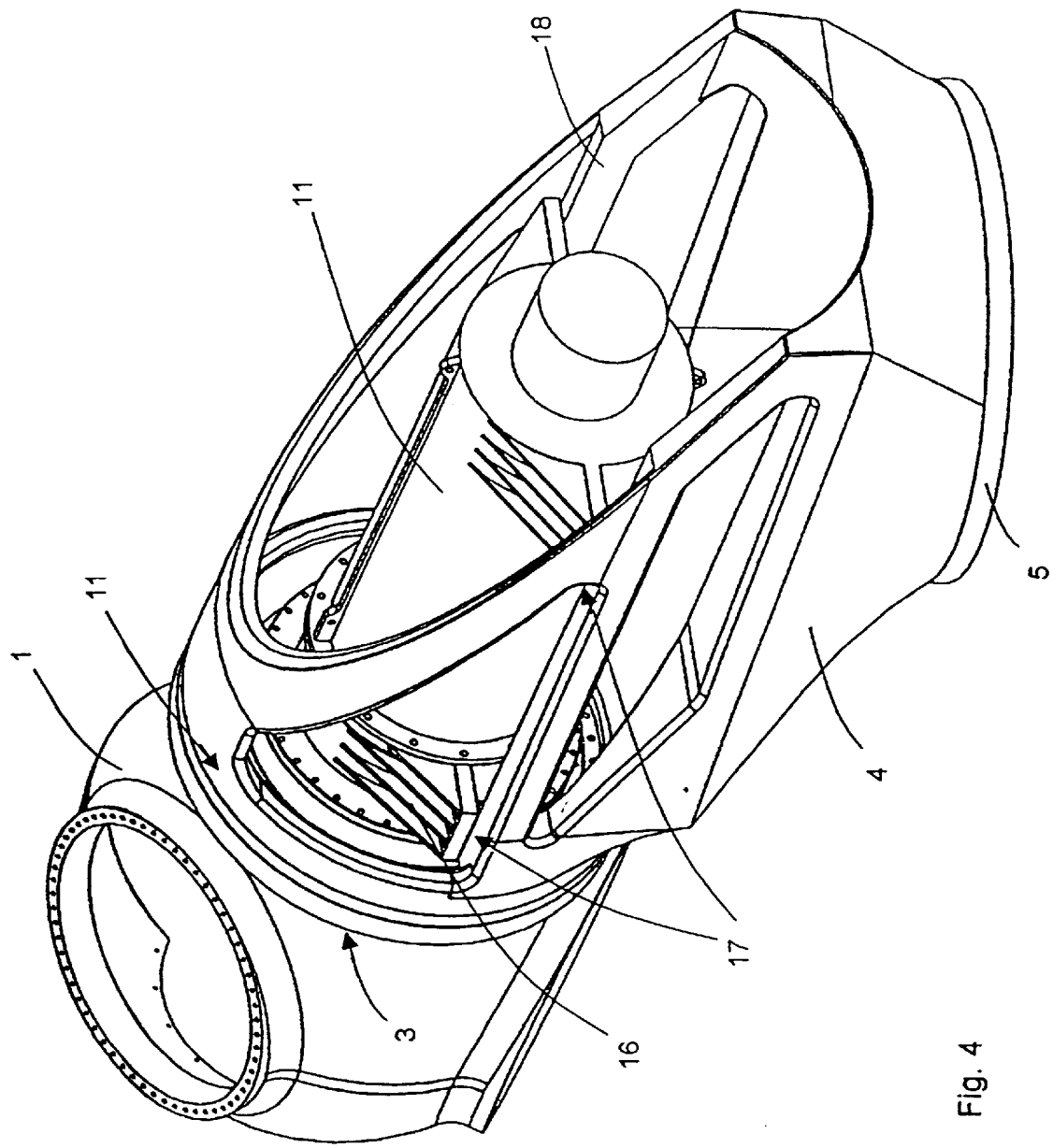

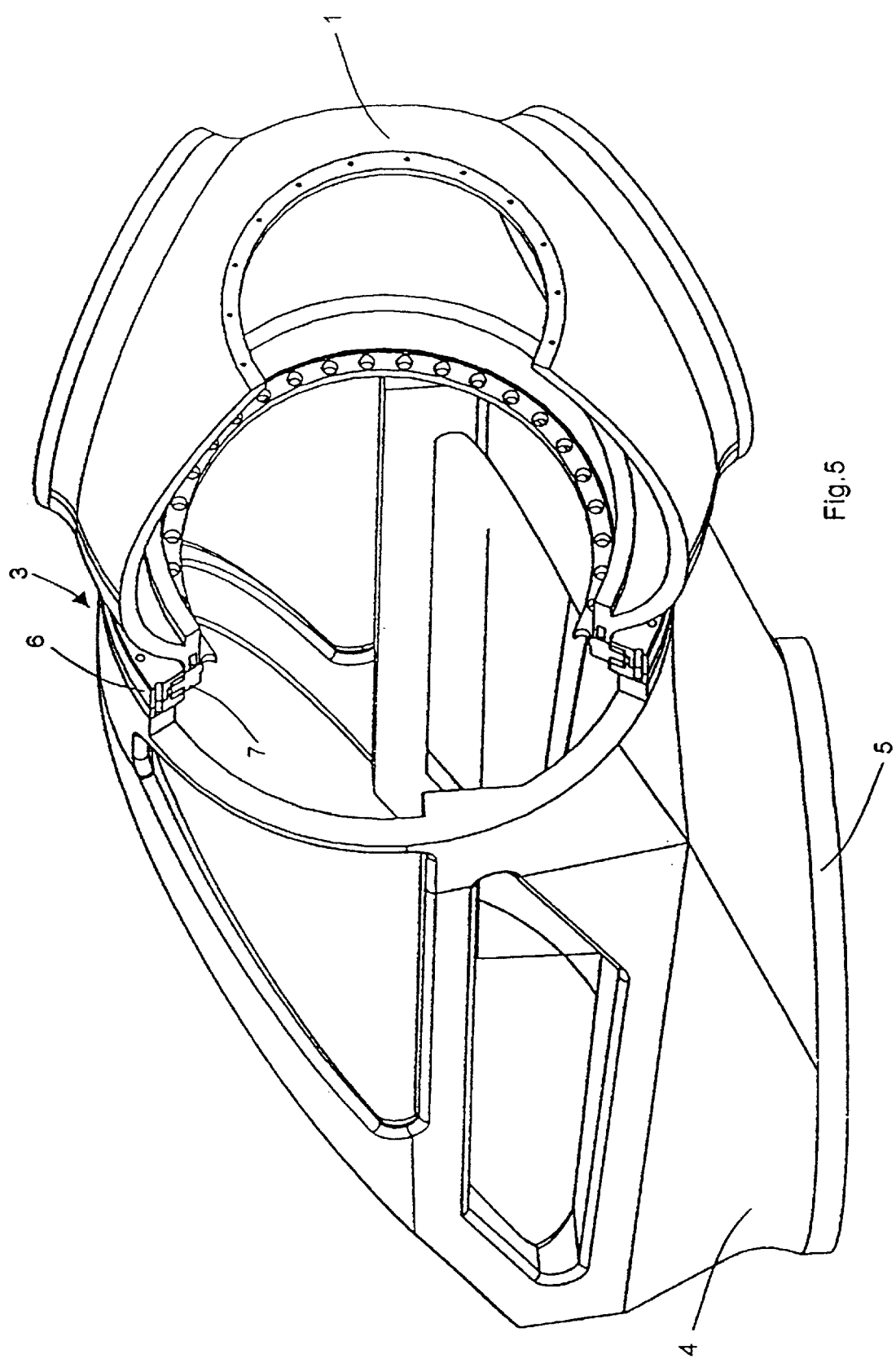

WINDMILL

The present invention concerns a wind-power plant as recited in the preamble to claim 1.

Ecology and the economy exert ever more stringent demands on contemporary wind-power plants. The economy requires that such plants be not only light in weight but also inexpensive to install, repair, and maintain. Off-shore in particular, the installation of a wind-power plant entails considerable expenditure, for on-board cranes and helicopters for example. Ecology on the other hand requires the minimization of noise from off-shore. These objectives entail total separation of the individual components.

The transmission trains employed in known wind-power plants (European Published Patent 635 639) comprise rotor blades, a hub with a shaft and bearing set, a multiple-stage planetary gear, a mechanical brake, a coupling, and a generator. The blades are mounted on the hub and rotate the shaft. The shaft is accommodated in a large roller bearing connected to an azimuth bearing by way of a frame. The force of the wind against the rotor are accordingly transmitted to a mast. This bearing system requires interposing part of the shaft between the rotor and the transmission. The downstream roller bearing consists of a transmission section with a hollow input shaft that is connected to the rotor shaft by an overturned disk. The overall transmission is also mounted on the frame by way of a two-armed torque accommodating strut. The transmission's high-speed driveshaft is connected to the generator's high-speed shaft by way of a double linkage coupling. The latter shaft is also mounted on a frame in the machinery housing. A brake is installed between the generator and the transmission. This known wind-power plant occupies a lot of space and is accordingly restricted in capacity. Furthermore, is complicated to mount and dismount.

The object of the present invention is a wind-power plant that will be more compact and easier to install, repair, and maintain.

Combining the transmission and generator into a single drive-train module, along with the special connection between the module and rotor hub and the roller bearing, allows the components to be simply and rapidly mounted on the already installed rotor support. Furthermore, the drive-train module is not coupled to the rotor support. The forces, torques, and deformations exerted by the wind on the rotor hub, the roller bearing, and the rotor support will have no negative effects on the transmission or generator.

Figure 1:
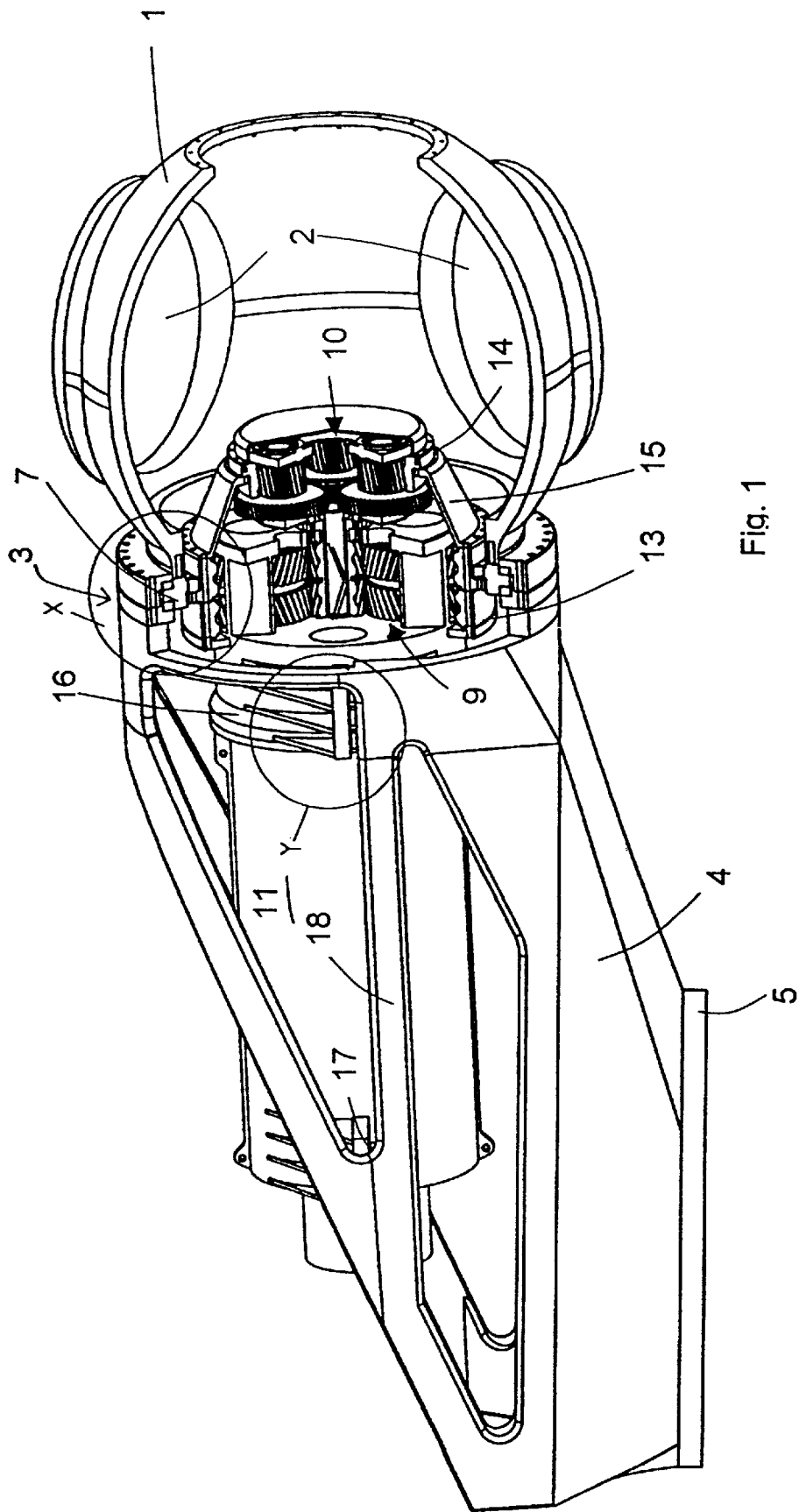
Figure 6:
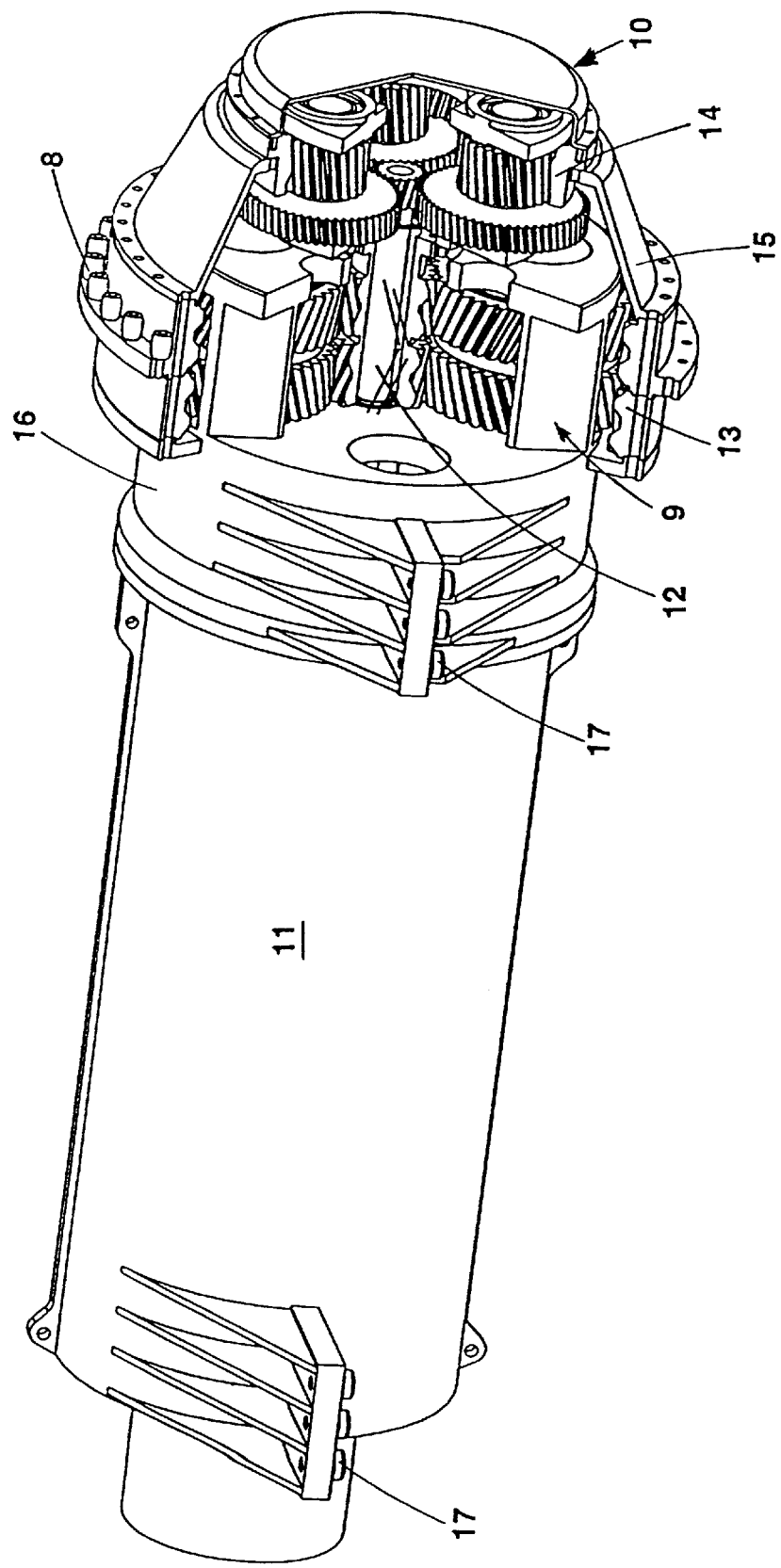

One embodiment of the present invention will now be specified with reference to the accompanying drawing, wherein FIG. 1 is a partly longitudinal-sectional and partly perspective view of a wind-power plant, FIG. 2 is a larger-scale detail of the area X in FIG. 1, FIG. 3 is a larger-scale detail of the area Y in FIG. 1, FIG. 4 depicts the structure of the plant's mast head, FIG. 5 illustrates the plant's rotor support, and FIG. 6 is an overall view of the wind-power plant.

The hub 1 of a rotor employed in a wind-power plant is provided with accommodations 2 for blades. Hub 1 is itself accommodated in a known type of large-scale roller bearing 3, which constitutes a radially secured axial bearing. Bearing 3 is attached to a rotor support 4. Rotor support 4 is connected to an unillustrated mast by way of an azimuth bearing 5. The forces exerted by the wind on the rotor's blades are accordingly diverted directly into the mast. Azimuth bearing 5 is engaged by an azimuth drive mechanism that maintains the wind-power plant facing into the wind.

Roller bearing 3 has a stationary outer ring 6 and a rotating inner ring 7. Outer ring 6 is rigidly fastened to rotor support 4. Hub 1 is screwed onto inner ring 7 and is provided with several bores that accommodate take-along bolts, preferably rubberized to suppress vibration.

The wind-power plant also includes a transmission in the form of a two-stage planetary gear comprising an input stage 9 and an output stage 10. Planetary gears of this form are generally known and the present example will be specified only to the extent that it is relevant to understanding of the invention. Each stage of the planetary gear includes a sun wheel, several planetary wheels accommodated in a planetary support, and a hollow wheel, all of which mutually mesh. The sun wheel 12 in input stage 9 is connected to the planetary housing in output stage 10. The axle of sun wheel 12 constitutes the gear's output shaft and is coupled to the shaft of a generator 11.

The inner ring 7 in roller bearing 3 is connected to the hollow wheel 13 in input stage 9 by way of take-along bolts 8. The power provided to the rotor is accordingly forwarded to the planetary gear. The hollow wheel 13 in input stage 9 is connected to another hollow wheel 14 in the output stage 10 in the planetary gear's rotating housing 15. Due to the connection between the hollow wheel 13 in housing 15 and the inner ring 7 in roller bearing 3, both housing 15 and hub 1 are accommodated in the wind-power plant's roller bearing 3. Planetary support 16 forwards the reaction torque deriving from the planetary gear into rotor support 4.

Since generator 11 is screwed onto the stationary planetary support 16 in input stage 9, the planetary gear and generator 11 are combined into a single drive-train module. This module is connected to rotor support 4 by way of vibration suppressors 17. The connection between hub 1 and the planetary gear by way of the rubberized take-along bolts 8 in the inner ring 7 in roller bearing 3 and the attachment of the planetary gear and generator 11 by way of vibration suppressors 17 results in total dynamic isolation of the drive-train module from the rest of the wind power plant. This reduces the plant's overall weight in that the module can be quite small.

How the wind-power plant is installed will now be specified. First, the rotor-support unit, comprising rotor support 4, mounting rails 18, roller bearing 3, and hub 1, is mounted on the mast. Next, the rotor blades are lifted through their accommodations and positioned therein by a crane mounted on rotor support 4. The same crane can be employed to raise the drive-train module, comprising the planetary gear and generator 11, onto rotor support 4. The module can also be removed from hub 1 along mounting rails 18 and lowered by the crane for repair and maintenance. The wind-power plant's modular construction also allows the planetary gear and its subassemblies and generator 11 to be removed from the mast by the crane individually or as a whole and replaced. It is in off-shore applications in particular that such a modular approach can considerably reduce the expense of maintaining a wind-power plant. Furthermore, downtime can be extensively decreased in the event of damage.

What is claimed is:

1. Wind-power plant with a rotor having a hub being accommodated in a roller bearing, the roller bearing being mounted on a rotor support and connected to a planetary gear, the planetary gear comprising two stages, specifically an input stage and an output stage, and a planetary gear output shaft being coupled by way of a clutch to a generator, wherein:

the roller bearing has an inner ring that is attached to and can be detached from the hub the generator has a housing that is combined with and can be removed from the planetary gear to constitute a drive-train module, and the module rests on the rotor support and can be separated from the plant.

2. Wind-power plant as in claim 1, having the inner ring of the roller bearing attached to a hollow wheel in the planetary gear input stage by bolts.

3. Wind-power plant as in claim 2, wherein the bolts suppress vibrations.

4. Wind-power plant as in claim 2, wherein the hollow wheel in the input stage and another hollow wheel in the output stage are connected to a rotating transmission housing accommodated in the roller bearing.

5. Wind-power plant as of claim 1 wherein a planetary support in the input stage rests on the rotor support.

6. Wind-power plant as in claim 5, wherein the planetary support in the input stage forwards a reaction torque from the planetary gear into said rotor support.

7. Wind-power plant as of claim 1 wherein the drive-train module rests on vibration suppressors on the rotor support.

* * * * *